Patented Jan. 9, 1951

2,537,814

UNITED STATES PATENT OFFICE 2,537,814

PREPARATION OF ACETONE CYANOHYDRIN

Harold S. Davis, Riverside, Conn., assignor to American Cyanamid Company, New York, N. Y., a corporation of Maine No Drawing. Application January 14, 1949, Serial No. 71,040. In Canada June 14, 1946

3 Claims. (Cl. 260—465.6)

1

The present invention relates to improvements in the production of acetone cyanohydrin.

It is well known that acetone cyanohydrin is formed by the reaction of hydrocyanic acid with acetone in the presence of a catalyst having an alkaline reaction such as, for example, an oxide or hydroxide of the alkali and alkaline earth metals, an alkali metal salt such as the alkali metal carbonates or cyanides, or an organic amine such as the primary, secondary and tertiary aliphatic amines. Generally a reaction temperature between about 20° and about 70° C. is employed. The reaction is reversible at those temperatures in alkaline solution and hence an equilibrium is reached with less than optimum quantities of the desired product. The reversible reaction stops when the solution is acidified under the above temperature conditions. The reaction is therefore incomplete and the acidified product contains substantial quantities of free hydrocyanic acid and acetone.

It has now been discovered that the proportion of unreacted reactants in the reaction product can be greatly decreased and consequently the yield of acetone cyanohydrin increased by cooling and "selectively freezing" the equilibrium mixture while in the alkaline state to a temperature below the freezing point of acetone cyanohydrin or even as low as −35° C. or lower so long as neither the reactants nor catalyst when in solution form will solidify, and maintaining the temperature below the freezing point of acetone cyanohydrin a length of time sufficient to permit the reaction to proceed to substantial completion, that is for at least 15 minutes, and thereafter acidifying the cooled mixture when the reaction has proceeded to an optimum degree, followed by recovery of the acetone cyanohydrin.

In accordance with this invention, the reaction of acetone and hydrocyanic acid in the presence of an alkaline catalyst to form acetone cyanohydrin is carried out to equilibrium at a temperature high enough for removal of the greater part of the heat of reaction by cooling water. The alkaline equilibrium mixture is then cooled to a temperature below the freezing point of acetone cyanohydrin and maintained there as above described. The free acetone and hydrocyanic acid concentrated in the reaction mixture react further to substantial completion. The product is then acidified while still cold, after which it can be maintained at ordinary room temperatures without substantial reversal.

If desired, the crude product obtained may be purified by any suitable method, for instance, by vacuum distillation. Purification of the cyanohydrin product may be omitted in certain instances for example, when it is to be subsequently used in the manufacture of hydroxyisobutyric acid and esters thereof.

Control of the pH of the crude cyanohydrin during purification and/or storage is important. As stated above, acetone cyanohydrin which is alkaline decomposes rapidly to hydrocyanic acid and acetone under these conditions. A pH of 3 to 4 should be maintained in order to prevent decomposition during storage. Under more vigorous conditions, such as those encountered in distillation, the pH should be held at 1 to 2.

As showing the incompleteness of the reaction at ordinary temperatures, a mixture of 12.50 lbs. of hydrocyanic acid (containing 3% by weight of water) and 26.87 lbs. of acetone was pumped continuously into a water-cooled tube reactor. Over the same period a potassium carbonate solution (0.12 lbs. of $K_2CO_3$ and 2.28 lbs. of water) was also pumped in to catalyze the reaction. The material in the first section of the reactor was recirculated by a pump and held at 40° to 44° C. In the second section the material flowed through without recirculation and left the section at 37° C. The reaction period was approximately ten minutes which was found to be sufficient for obtaining equilibrium. A sample taken from the reaction mixture at 37° C. was immediately acidified with phosphoric acid and then analyzed.

The analysis of the sample was:

| Per Cent HCN | Per Cent Acetone Cyanohydrin | Yield of Acetone Cyanohydrin |
|---|---|---|
| 3.89 | 79.07 | 86.6 |

The following shows the improved yields when following the procedure of the present invention.

Example 1

A mixture of 9.0 lbs. of hydrocyanic acid and 19.3 lbs. of acetone was pumped continuously into a water-cooled tube reactor. Over the same period 1.65 lbs. of a 5% potassium carbonate solution were pumped in to catalyze the reaction. The material in the first section of the reactor was recirculated by a pump and held at 40° to 43° C. In the second section the material flowed through without recirculation and left the section at 37° C. It then entered a third section maintained at −20° C., from which it passed to a receiving vessel where it was stored at —20° C. for one and three-quarters hours. The cold product was then acidified with phosphoric acid and analyzed.

The analysis of the product was:

| Per Cent HCN | Per Cent Acetone Cyanohydrin | Yield of Acetone Cyanohydrin |
|---|---|---|
| 0.59 | 91.9 | 98.9 |

*Example 2*

A charge consisting of 9.0 lbs. of hydrocyanic acid, 19.3 lbs. of acetone and 1.28 lbs. of a 5% potassium carbonate solution was treated in the reactor according to the procedure of Example 1. The reaction product taken from the reactor at 37° C. was divided into seven parts. One sample (labeled as the control) was cooled to room temperature (25° C.), then acidified with phosphoric acid and analyzed. The remaining six samples were cooled to —20° C. Each sample was then stored for a certain period at —20° C., acidified while cold, and analyzed. The following table gives the storage period and analysis of each sample.

| Sample | Storage period in Minutes | Per Cent HCN | Purity of the Acetone Cyanohydrin |
|---|---|---|---|
| 1 | (control) | 3.25 | 84.1 |
| 2 | 5 | 1.78 | 88.7 |
| 3 | 10 | 1.37 | 90.7 |
| 4 | 15 | 1.10 | 91.1 |
| 5 | 30 | 0.88 | 92.5 |
| 6 | 60 | 0.79 | 92.6 |
| 7 | 120 | 0.87 | 92.4 |

It may be noted from the above table that the reaction was substantially complete between 15 and 30 minutes. The yield of acetone cyanohydrin at the end of the 15 minute period was 98%.

The essential feature of this invention is therefore the cooling of the reaction mixture to a temperature below the freezing point of the cyanohydrin and maintaining it below the freezing point for at least 15 minutes, followed by recovery. It has been found that the solid phase which separates from the cold reaction mixture is pure acetone cyanohydrin. Hence, when equilibrium has been reached in the mixture around the cyanohydrin crystals, a greater union of acetone with hydrocyanic acid to form acetone cyanohydrin is attained than can be reached in a purely liquid reaction mixture. By this operation, the effect of any excess acetone in forcing the reaction of the hydrocyanic acid to completion is also intensified.

This application is a continuation-in-part of applicant's copending application Serial No. 615.692, filed September 11, 1945, now abandoned.

While the invention has been described with particular reference to specific embodiments, it is to be understood that it is not to be limited thereto but is to be construed broadly and restricted solely by the scope of the appended claims.

I claim:

1. In a process for the preparation of acetone cyanohydrin wherein acetone, HCN, and an alkaline catalyst are first reacted at a temperature high enough for removal of the greater part of the heat of reaction by cooling water until an equilibrium mixture comprising acetone cyanohydrin is substantially obtained, said mixture is subsequently maintained at a lower temperature until a new equilibrium mixture is substantially obtained containing a higher proportion of acetone cyanohydrin, and said latter mixture is acidified, whereby the effectiveness of said catalyst is destroyed and reversal of the reaction is substantially prevented, the improvement which consists in selectively freezing said acetone cyanohydrin in said mixture for at least 15 minutes immediately prior to said acidification.

2. The process according to claim 1, wherein said acetone and said HCN are present in substantially equimolecular proportions.

3. The process according to claim 1, wherein the acetone cyanohydrin is frozen at a temperature of about —20° C. for about 15 minutes.

HAROLD S. DAVIS.

REFERENCES CITED

The following references are of record in the file of this patent:

UNITED STATES PATENTS

| Number | Name | Date |
|---|---|---|
| 2,101,823 | Dittmar | Dec. 7, 1937 |